US00RE36458E

United States Patent [19]

Quinn et al.

[11] E Patent Number: Re. 36,458

[45] Reissued Date of Patent: Dec. 21, 1999

[54] PATTERNED HEAT WELDING ROD FOR SEAMING RESILIENT FLOORING

[75] Inventors: Edwin J. Quinn; Manuel A. Velez; Richard M. Ringer, all of Lancaster; Michael E. Buckwalter, New Providence, all of Pa.

[73] Assignee: Armstrong World Industries, Inc., Lancaster, Pa.

[21] Appl. No.: 08/911,622

[22] Filed: Aug. 15, 1997

Related U.S. Patent Documents

Reissue of:

[64] Patent No.: 5,635,266
Issued: Jun. 3, 1997
Appl. No.: 07/976,533
Filed: Nov. 16, 1992

[51] Int. Cl.[6] ..... B32B 3/00

[52] U.S. Cl. ..... 428/57; 52/389; 52/390; 156/304.6; 156/308.4; 156/309.6; 219/145.1; 219/146.1; 219/146.31; 428/44; 428/323; 428/327; 428/364; 523/220; 523/221; 524/270; 524/274; 524/524; 524/527

[58] Field of Search ..... 428/57, 44, 364, 428/323, 327; 52/389, 390; 523/280, 221; 219/145.1, 146.1, 146.31; 524/270, 274, 524, 527; 156/304.6, 309.6, 308.4

[56] References Cited

U.S. PATENT DOCUMENTS

| | | | |
|---|---|---|---|
| 2,839,441 | 6/1958 | Kent | 154/116 |
| 3,421,277 | 1/1969 | Frischmuth | 52/390 |
| 3,839,126 | 10/1974 | Haller | 156/497 |
| 4,396,566 | 8/1983 | Brinkmann et al. | 264/70 |
| 4,840,669 | 6/1989 | Hughes et al. | 106/19 |
| 4,990,013 | 2/1991 | Hejmanowski | 401/49 |
| 5,084,493 | 1/1992 | Olson et al. | 523/164 |
| 5,294,657 | 3/1994 | Melendy et al. | 524/270 |
| 5,383,954 | 1/1995 | Craig | 106/19 |

FOREIGN PATENT DOCUMENTS

| | | |
|---|---|---|
| 989058 | 9/1951 | France . |
| 24 12 101 | 9/1975 | Germany . |
| 47-7718 | 4/1972 | Japan . |
| 57-69008 | 4/1982 | Japan . |
| 368616 | 3/1932 | United Kingdom . |
| WO 89/05228 | 6/1989 | WIPO . |

*Primary Examiner*—Nasser Ahmad

[57] ABSTRACT

Vinyl heat welding rod for seam sealing vinyl resilient flooring, whether in sheet or tile form, are used to obtain a homogeneous, monolithic appearing surface. This rod is specifically made to duplicate the appearance of the flooring material. For a chip-image flooring structure, a sheet of multicolored chips having a similar, but different formulation from that of the flooring material is prepared and the sheet is cut into suitable strips, heat pressed in a rod mold, end adhered or further molded to form the desired length, and used as a vinyl heat welding rod for sealing seams in flooring. Thus, the chip pattern is evident in the seam area and does not appear different when compared to the adjacent surface.

19 Claims, 1 Drawing Sheet

PATTERNED HEAT WELDING ROD FOR SEAMING RESILIENT FLOORING

Matter enclosed in heavy brackets [ ] appears in the original patent but forms no part of this reissue specification; matter printed in italics indicates the additions made by reissue.

FIELD OF THE INVENTION

This invention relates to a thermoplastic welding rod used to join two pieces of thermoplastic sheeting, particularly flooring, together. More specifically, a patterned welding rod is prepared that, when welded between two pieces of the same patterned polyvinyl chloride resilient sheet flooring, disguises the joined area and forms a water-tight, sealed assembly. The pattern may be a multicolored, chip-image; a multicolored, granule-image; or other pattern. Preferably, the colors of the particles are contrasting colors.

BACKGROUND OF THE INVENTION

The use of an extruded, solid colored or clear, polyvinyl chloride, round cross-section welding rod is well known in the art to join two pieces of vinyl resilient flooring together. This prior art process uses an unfilled, highly plasticized, colored polyvinyl chloride formulation that is in turn extruded through a round die to form a round cross-section, flexible, easily cut rod for seam sealing.

Extrusion yields a solid color rod or, in some cases in which there are shade variations, a swirl effect such as a barber pole results. In no instance is a distinct sharp edge design obtained. The solid color rod areas appear as a seam of solid contrasting color at every welded installation site creating a discontinuity in the flooring surface. This disrupts the flooring pattern image. The desire for a single image flooring or a flooring surface wider than the width of the flooring product, but having a continuous image has been expressed by many designers, architects, etc. No known welding rod containing a distinct pattern is known. Attempts to make such a patterned welding rod have been made in the United States, Europe, and the Far East, especially Japan, without success.

Attempts to fabricate extruded rods with colored particles requires the use of hard, non-thermoplastic, or solid colored particles that will maintain their image and do not flow during the heat developed during blending and extrusion. However, during extrusion these hard particles score or cut into the extruder barrel causing damage to the equipment. Further, they prevent the smooth, easy cutting or skiving of the welded rod when removing the excess rod material above the wear surface of the flooring, thus yielding a non-smooth surface. Such a non-smooth surface provides places where dirt particles can be trapped leading to dirty, unsightly surface conditions.

The use of the multi-colored, chip- or granule-image vinyl resilient sheet flooring for a welding rod has been attempted many times. Generally, a thin strip of flooring is cut approximately the size of a welding rod, typically 2 to 4 mm wide, and welded in the seam area. Strips having an inorganic filler, such as limestone at 20 to 65 weight percent, rapidly elongate and pull apart in the first few inches of welding due to the extremely high welding gun air temperatures, generally 300° C. (572° F.) to 600° C. (1112° F.).

Attempts to utilize the original multi-colored, vinyl chips, that are used in the flooring production, in a mold/press were unsuccessful in maintaining the chip-image. In order to consolidate these chips, whether filled or unfilled with inorganic material, sufficient heat, above 350° F., is required to ensure thermoplastic flow so that the chips are fused together in a solid, coherent mass. This product flow is enough to disrupt the chip-images forming a smeared, blurred image. This is not suitable as a welding material since the image is different from the original flooring material.

SUMMARY OF THE INVENTION

The patterned welding rod of the present invention is fabricated by first preparing a consolidated sheet of colored vinyl chips or granules, color-matched to the flooring that is to be seamed and with the pigmented chips in the correct weight ratio. Second, Across Machine Direction (AMD)-cut strips of this sheet are placed in a suitable mold with a flat top, heated, and compressed to form half-round rods. These, in turn, can be heat joined together to form any length of rod desired. This "half round" welding rod can be heat welded in the area between two pieces of the color-matched vinyl flooring to form a homogeneous weld. This welded strip is cut or skived flat to the adjacent so that no seam can be discerned. The final effect is a monolithic appearing surface that is completely sealed.

The use of AMD-cut strips is necessary so that the chip- or granule-image will not smear when heated or pressed in the mold. When Machine Direction (MD) consolidated strips are used in the mold, the effect is a continuation of internal chip distortion begun during sheet consolidation. Additional stretching of chip image during heat welding using MD mold rods further blurs and smears the desired image.

DETAILED DESCRIPTION OF THE INVENTION

The patterned welding rod is prepared in four steps: 1—chip preparation, 2—chip consolidation, 3—cutting and press molding, and 4—joining together and separating. The chips are formulated and then consolidated into a sheet. The sheet is cut into strips and press molded into half-round cross-section welding rods. The length of the rods is increased by leaving one end of the molded rod in the mold while molding the next section or rod, thereby joining the two rod sections. Since multiple rods are molded simultaneously and are joined by lands between the mold cavities, the welding rods must be separated into individual rods by severing the lands.

The condensed sheet thickness for the welding rod must be slightly thicker than the final rod product thickness to ensure complete filling of the mold cavities and smooth, well consolidated final product. Insufficient material forms a rod with open spaces creating a weak rod which will not fill the desired seam area completely.

If chips, and not a consolidated sheet, were placed in the mold cavity, the rod is not completely consolidated. The flow of the chips in this instance is insufficient to completely fuse together and to form a rod without smears.

Chips when placed in a round mold, the top and bottom cavities having rounded grooves, will form a round rod. However, when the rod is welded in place and then skived, the chip image will be smeared. This is due to the material flow caused by the heat and pressure in the center of the rod structure which is different from that in contact with or adjacent the mold.

Figure 1:
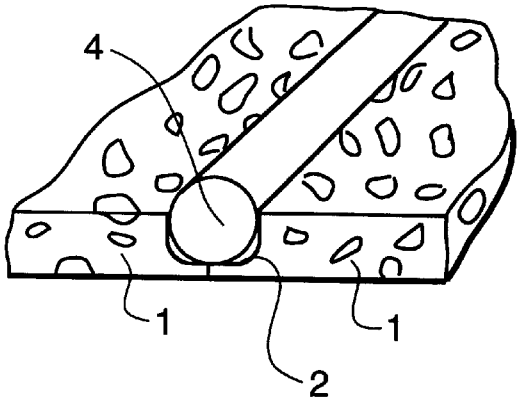
PRIOR ART FIG. 1
FIG. 1 is a schematic representation of a prior art floor covering prior to welding the welding rod.
Figure 3:
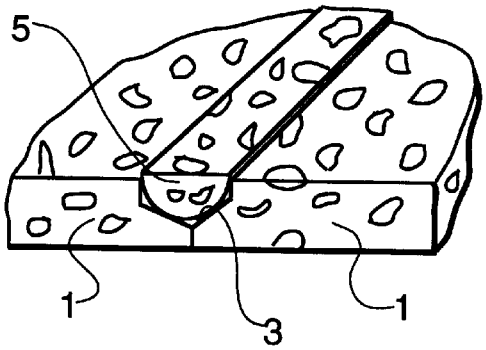
FIG. 3 is a schematic representation of the present floor covering prior to welding the welding rod.
Figure 2:
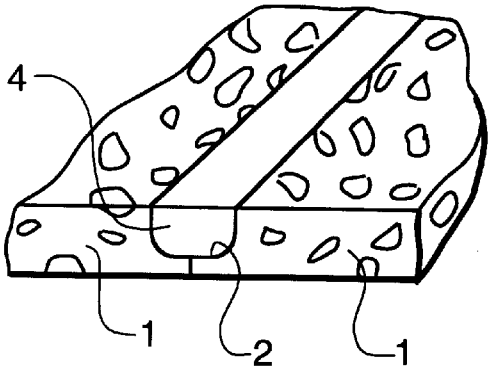
PRIOR ART FIG. 2
FIG. 2 is a schematic representation of a prior art floor covering after welding the welding rod.
Figure 4:
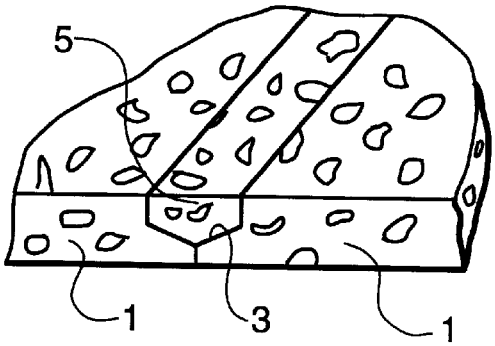
FIG. 4 is a schematic representation of the present floor covering after welding the welding rod.

As shown in the Figures, two sheets of surface coverings 1 are welded together by abutting two edges, routing the edges, and placing a welding rod into the routed groove and melting the rod. The groove may be a U-shaped groove 2 as shown in FIGS. 1 and 2, or a pentagonal groove 3 as shown in FIGS. 3 and 4. The shape of the groove is not critical.

The process of the prior art is shown in FIGS. 1 and 2. The round cross-section welding rod 4 of the prior art is placed in the groove 2. Due to the shape of the groove, there are gaps below the welding rod. These gaps fill when the welding rod is melted. Then the excess rod is cut off or skived with a knife so that the exposed surface of the rod 4 is even with the exposed surface of the surface covering.

The process of the present invention is the same as the prior art except that the patterned half-round welding rod 5 is used. After the rod is melted, a small portion of the rod is removed by skiving. Since the center of the rod smears more than the portions of the rod near its edges, the chip pattern of the exposed surface is clearer and sharper than would be the case if a patterned round cross-section rod were used.

Patterned welding rods having a filler content of 0% to 75% by weight can be used. The preferred range is 4% to 20% by weight and the most preferred range is 6% to 10% by weight. The higher filler levels, especially 20% to 70% by weight yield welding rods with low strength values and they tend to easily elongate and pull apart during welding.

Small particle size filler, U.S. No. 50 mesh or smaller (larger mesh number), is preferred. Larger size particles tend to cause drag on the skiving knife which results in installation problems. Also, it is preferred to use filler particles at least U.S. No. 325 mesh is size or larger (smaller mesh number) since smaller particles, especially dust particles, require more plasticizer to coat the particles.

To minimize plasticizer migration, the welding rod formulation, especially the plasticizer system, must be balanced with the surface covering formulation. The plasticizer content and type should be similar between the welding rod and surface covering.

Flooring is typically installed at temperatures between 55° F. to 85° F. Therefore, flexibility and ease of cutting must be maintained even near the lower end of the range. This is done by the addition of a low temperature plasticizer such as dioctyl adipate. Preferably the glass transition temperature, $T_g$, of the plasticized chips is no greater than 30° F., more preferably no greater than 25° F., and most preferably no greater than 22° F.

Thermoplastic materials which can be used to make the thermoplastic welding rods include polyvinyl chloride, acrylonitrile/butadiene/styrene, polypropylene, polyethylene, and thermoplastic polyurethane. Other thermoplastic resins that can be plasticized and used include polyvinyl acetate, cellulose acetate, polystyrene, ethyl cellulose, polyvinylidene chloride, polyurethane, nylon, acrylic, and polyphenylene oxide. The following thermoplastic resins have been used to make welding rods of the present invention polyvinyl chloride homopolymers and copolymers with acetate functionality, and mixtures thereof. Polyvinyl chloride homopolymers are preferred.

A series of resin materials with varying molecular weights, as determined by specific viscosity, were evaluated. The range of specific viscosities used was from 0.22, classified as low molecular weight, to 0.44, classified as high molecular weight. The preferred specific viscosity range was 0.30 to 0.36, considered as medium molecular weight. All of the resins tested made welding rods.

The low molecular weight systems, homopolymers, copolymers and mixtures thereof, yielded satisfactory, but soft rods. These installed properly, but tended to have a soft surface which was easily indented and was susceptible to dirt impregnation.

The high molecular weight homopolymer resins formed satisfactory rods, but on installation required high welding heat which sometimes caused discoloration or scorching. When cooled these high molecular weight rods required more effort to skive and were significantly more difficult to install properly.

Plasticizers which can be used include butyl cyclohexyl phthalate, tri(butoxyethyl) phosphate, trioctyl phosphate, 2-ethylhexyl diphenyl phosphate, dibutyl phthalate, diisobutyl adipate, epoxidized di(2-ethylhexyl) tetrahydrophthalate, di(2-ethylhexyl) phthalate, diisooctyl phthalate, dioctyl adipate, diisononyl phthalate, di(2-ethylhexyl) hexahydrophthalate, n-octyl,n-decyl phthalate, tricresyl phosphate, butyl benzyl phthalate, dicapryl phthalate, di(3,5,5-trimethylhexyl) phthalate, diisodecyl phthalate, di(2-ethylhexyl) adipate, butyl epoxy stearate, epoxidized soya oil, epoxidized octyl tallate, dimethyl phthalate, hexyl epoxy stearate, cresyl diphenyl phosphate, di(2-ethylhexyl) isophthalate, n-octyl,n-decyl adipate, di(2-ethylhexyl) azelate, epoxidized octyl oleate, di(2-ethylhexyl) sebacate, tetraethylene glycol/di(2-ethylhexoate), diisodecyl adipate, and triethylene glycol/di(2-ethylhexoate). Total plasticizer concentration should be between 35 and 60 phr, preferably between 40 to 55 phr, and most preferably between 45 and 50 phr. Combinations of plasticizers, as shown in the examples, are preferred.

Fillers which can be used in compounding the various resins include calcium carbonate (limestone—natural, surface treated, precipitated), hydrated magnesium silicate, barium sulfate, aluminum silicate, magnesium hydroxide, diatomaceous silicate, hydrated calcium silicate, silicon dioxide, and calcium sulfate. Welding rods using limestone, aluminum silicate and silicon dioxide were made.

EXAMPLE 1: ROD PREPARATION

The following formulation was prepared in sheet form in 3 to 6 solid colors as determined from the flooring product that the final rod was to be used to seam seal together.

FORMULATION 1

| Material | PHR | Weight % |
|---|---|---|
| PVC Resin | 100.00 | 62.64 |
| Di(2-ethylhexyl) Phthalate | 19.43 | 12.17 |
| Diisononyl Phthalate | 21.17 | 13.26 |
| Dioctyl Adipate | 3.00 | 1.88 |
| Epoxidized Soya Oil | 4.20 | 2.63 |
| Stabilizers | 2.08 | 1.30 |
| Limestone, 325 Mesh | 9.76 | 6.12 |
| Pigments | (As Required) | |
| | 159.64 | 100.00 |

The above ingredients were blended in suitable large-scale mixers and then sheeted to the desired thickness, 32 mils, by use of a two roll calender. Each color sheet was then cut and ground to the desired chip size. The sieve analysis of the final chip product used a 200 g sample, shaken for 3 minutes, on a standard U.S. No. 12 mesh screen. All material retained on the screen, 70–80 weight percent, was used for chip consolidation.

The above chips were then heated to about 425° F. on a support carrier and consolidated between 2 large metal rolls. This formed a consolidate sheet having the desired chip image in a sheet thickness of 85–95 mils and a width of 74 inches.

The above consolidated sheet was then cut into 3-inch wide by 6-foot long AMD strips. This is the width which fit into the press mold cavity. The press mold consisted of a one-half inch thick, stress-relieved, steel block, 4-inches wide by 36-inches long, having 16 semi-circular grooves cut in the lengthwise direction. Each groove was 86 mils deep with a diameter of 172 mils. The thickness of the material between the tops of two grooves was 6 mils wide. This is known as the land between adjacent grooves. The mold top was a piece of flat steel. A strip 3-inches wide was placed in the mold in a press and heated at 160° C. for 2 minutes at a pressure of 80 psi. The mold was cooled, pressure was released, and the material was either removed from the mold or was moved partially out of one end and a new strip was placed tightly against the previously molded piece. This assembly was again subject to heat and pressure. The material being thermoplastic flowed enough at the contact surfaces to form a homogeneous bond. No joint line could be seen. Any number of pieces may be joined together in this manner to form welding rods of any desired length. The joined, molded pieces were then slit apart using a suitable slitting device or knife. The final product was a half-round welding rod having a top surface 172 mils wide and a radius depth of 86 mils.

EXAMPLE 2: USE OF THE ROD

The patterned welding rod as prepared in Example 1 was made from 5 solid color chips to match the appearance of Armstrong Medintech vinyl flooring, Pattern No. 86472.

The Medintech Flooring, Pattern No. 86472, was installed on a concrete subfloor according to the Armstrong installation manual with a full spread adhesive. The seams were routed or grooved in a U-shape using a rotating blade tool to a depth of ⅔ of the flooring thickness. The router instrument used was Leister Router, Solingen, Germany, 110 V, 50 HZ, 1000 watts, 18000 RPM.

A Leister heat welding gun, type GHIBI, 120 V, 50/60 HZ, 1560 watts, having a variable temperature setting, set at 450° C. was allowed to preheat and was used to weld the half-round patterned welding rod in the routed seam area. This gun used a 5 mm, triangular Speed Nozzle, manufactured by Leister to heat the rod and to direct the rod into the routed groove. The welded rod was allowed to cool to room temperature before it was cut flush with the flooring. Removal of the excess welding rod was done in two passes. The first cutting pass used a trim plate on a Leister skiving knife to remove most of the excess rod. The second pass using only the skiving knife cut the rod flush with the flooring to yield a smooth, continuous, essentially indiscernible seam. The flooring/seam assembly may be waxed, polished as desired.

EXAMPLE 3: USE OF CHIP FORMULA WITHOUT LIMESTONE FILLER

The following formulation was prepared in chip form, consolidated, and formed into a half-round welding rod as per Example 1. This formulation was the formulation of Example 1 without the limestone filler.

FORMULATION 2

| Material | PHR | Weight % |
|---|---|---|
| PVC Resin | 100.00 | 67.33 |
| Di(2-ethylhexyl) Phthalate | 19.00 | 12.79 |
| Diisononyl Phthalate | 22.80 | 15.35 |
| Epoxidized Soya Oil | 4.50 | 3.03 |
| Stabilizers | 2.23 | 1.50 |
| Pigments | (As Required) | |
| | 148.53 | 100.00 |

The chips were sticky, tended to hold cooling water on their surface, and clumped together making processing difficult. The welding rod was installed as per Example 2. This rod was stiff and hard to handle. After installation, it was hard to skive smooth, requiring much effort to trim the seam material. It was difficult to make a smooth continuous cut.

EXAMPLE 4: USE OF LIMESTONE FILLER

The following formulation was prepared in chip form, consolidated, and formed into a half-round welding rod as per Example 1.

FORMULATION 3

| Material | PHR | Weight % |
|---|---|---|
| PVC Resin | 100.00 | 63.07 |
| Di(2-ethylhexyl) Phthalate | 19.00 | 11.99 |
| Diisononyl Phthalate | 22.80 | 14.38 |
| Epoxidized Soya Oil | 4.50 | 2.84 |
| Stabilizers | 2.23 | 1.41 |
| Limestone, 325 Mesh | 10.00 | 6.31 |
| Pigments | (As Required) | |
| | 158.53 | 100.00 |

The chips consolidated without problem. The installed half-round rod skived readily at room temperature, but was very hard to cut at cold (55° F.) temperature. Skiving required much energy and the final cut was not smooth. This presented an area that would collect dirt and provide a maintenance problem.

EXAMPLE 5: HIGH FILLER CONTENT—DIFFERENT FILLER

The following formulation was prepared in chip form, consolidated, and formed into a half-round rod as per Example 1.

FORMULATION 4

| Material | PHR | Weight % |
|---|---|---|
| PVC Resin | 100.00 | 46.25 |
| Di(2-ethylhexyl) Phthalate | 16.05 | 7.42 |
| Diisononyl Phthalate | 18.47 | 8.54 |
| Epoxidized Soya Oil | 4.48 | 2.07 |

-continued

| FORMULATION 4 | | |
|---|---|---|
| Material | PHR | Weight % |
| Stabilizers | 2.23 | 1.03 |
| Sodium Aluminium Silicate | 75.00 | 34.69 |
| Pigments | (As Required) | |
| | 216.23 | 100.00 |

Attempts were made to install the welding rod as per Example 2. Long seams could not be installed with this rod. It would break—pull apart—when welding was started due to the high heats required. When the rod was installed it was hard to skive. Much effort was required and the resulting rod surface was not smooth. Stress whitening was also observed due to the heavy filler concentration.

EXAMPLE 6: USE OF LARGE PARTICLE SIZE LIMESTONE FILLER

The following formulation was prepared in chip form, consolidated, and formed into a half-round rod as per Example 1.

| FORMULATION 5 | | |
|---|---|---|
| Material | PHR | Weight % |
| PVC Resin | 100.00 | 63.07 |
| Di(2-ethylhexyl) Phthalate | 19.00 | 11.99 |
| Diisononyl Phthalate | 22.80 | 14.38 |
| Epoxidized Soya Oil | 4.50 | 2.84 |
| Stabilizers | 2.23 | 1.41 |
| 50 mesh Limestone | 10.00 | 6.31 |
| Pigments | (As Required) | |
| | 158.53 | 100.00 |

The welding rod was installed as per Example 2. When the excess rod was skived off, the final surface was rough, not smooth as desired due to the limestone particles. The rough cut surface had imperfections in the surface which would become dirt traps, causing maintenance problems.

EXAMPLE 7: USE OF MORE THAN ONE PVC RESIN

The following formulation was prepared in chip form, consolidated, and formed into a half-round welding rod as per Example 1. In this case a PVC homopolymer and a PVC copolymer (with chloride and acetate functionality) were used.

| FORMULATION 6 | | |
|---|---|---|
| Material | PHR | Weight % |
| PVC Homopolymer (medium molecular weight) | 50.00 | 31.54 |
| PVC Copolymer (85/15 PVC/PVAc) | 50.00 | 31.54 |
| Di(2-ethylhexyl) Phthalate | 19.00 | 11.99 |
| Diisononyl Phthalate | 22.80 | 14.38 |
| Epoxidized Soya Oil | 4.50 | 2.84 |

-continued

| FORMULATION 6 | | |
|---|---|---|
| Material | PHR | Weight % |
| Stabilizers | 2.23 | 1.40 |
| 325 mesh Limestone | 10.00 | 6.31 |
| Pigments | (As Required) | |
| | 158.53 | 100.00 |

The welding rod was installed as per Example 2. No difficulty was encountered in skiving this rod at room temperature, but it was significantly more difficult to cut at 55° F.

We claim:

1. A thermoplastic welding rod *consisting essentially of thermoplastic particles, the particles* comprising a first plurality of thermoplastic particles and a second plurality of thermoplastic particles, the second plurality of thermoplastic particles having a color different than the color of the first plurality of thermoplastic particles, the first and second plurality of thermoplastic particles comprising about 18 to about 31 weight percent of plasticizer.

2. The welding rod of claim 1 wherein the particles are chips comprising thermoplastic material.

3. The welding rod of claim 1 wherein the particles are granules comprising thermoplastic material.

4. The welding rod of claim 1 wherein the particles comprise no greater than 20% by weight of filler.

5. The welding rod of claim 4 wherein the particles comprise no greater than 10% by weight of filler.

6. The welding rod of claim 4 wherein the filler is no greater in size than U.S. No. 50 mesh.

7. The welding rod of claim 6 wherein the filler is no less in size than U.S. No. 325 mesh.

8. The welding rod of claim 1 wherein the particles have a $T_g$ of no greater than 30° F.

9. The welding rod of claim 8 wherein the particles have a $T_g$ of no greater than 25° F.

10. The welding rod of claim 9 wherein the particles have a $T_g$ of no greater than 22° F.

11. The welding rod of claim 1 wherein the rod has a half-round cross-sectional shape.

12. The welding rod of claim 1 wherein the first and second pluralities of chips comprise consolidated chips.

13. The welding rod of claim 12 wherein the rod is a molded rod.

14. The welding rod of claim 13 wherein the rod comprises a plurality of rods spliced end-to-end.

15. A thermoplastic welding rod *consisting essentially of thermoplastic particles, the particles* comprising a first plurality of thermoplastic particles and a second plurality of thermoplastic particles, the second plurality of thermoplastic particles having a color different than the color of the first plurality of thermoplastic particles, the thermomlastic particles comprising an organic polymer, the polymer consisting essentially of polyvinyl chloride.

16. A surface covering comprising two thermoplastic sheets welded together with a thermoplastic welding rod, the welding rod *consisting essentially of thermoplastic particles, the particles* comprising a first plurality of thermoplastic particies and a second plurality of thermoplastic particles, the second plurality of thermoplastic particles having a color different than the color of the first plurality of thermoplastic particles.

17. The surface covering of claim 16 wherein the welding rod is formed by the first and second pluralities of thermoplastic particles being consolidated to form an elongated element having a half-round cross-sectional shape.

18. The surface covering of claim 17 wherein the surface covering is a floor covering.

19. The welding rod of claim 1 wherein the plasticizer is selected from the group consisting of dioctyl adipate, butyl cyclohexyl phthalate, tri(butoxyethyl) phosphate, trioctyl phosphate, 2-ethylhexyl diphenyl phosphate, dibutyl phthalate, diisobutyl adipate, epoxidized di(2-ethylhexyl) tetrahydrophthalate, di(2-ethylhexyl) phthalate, diisooctyl phthalate, dioctyl adipate, diisononyl phthalate, di(2-ethylhexyl) hexahydrophthalate, n-octyl,n-decyl phthalate, tricresyl phosphate, butyl benzyl phthalate, dicapryl phthalate, di(3,5,5-trimethylhexyl) phthalate, diisodecyl phthalate, di(2-ethylhexyl) adipate, butyl epoxy stearate, epoxidized soya oil, epoxidized octyl tallate, dimethyl phthalate, hexyl epoxy stearate, cresyl diphenyl phosphate, di(2-ethylhexyl) isophthalate, n-octyl,n-decyl adipate, di(2-ethylhexyl) azelate, epoxidized octyl oleate, di(2-ethylhexyl) sebacate, tetraethylene glycol/di(2-ethylhexoate), diisodecyl adipate, triethylene glycol/di (2ethylhexoate), and mixtures thereof.

* * * * *